Figure 1:
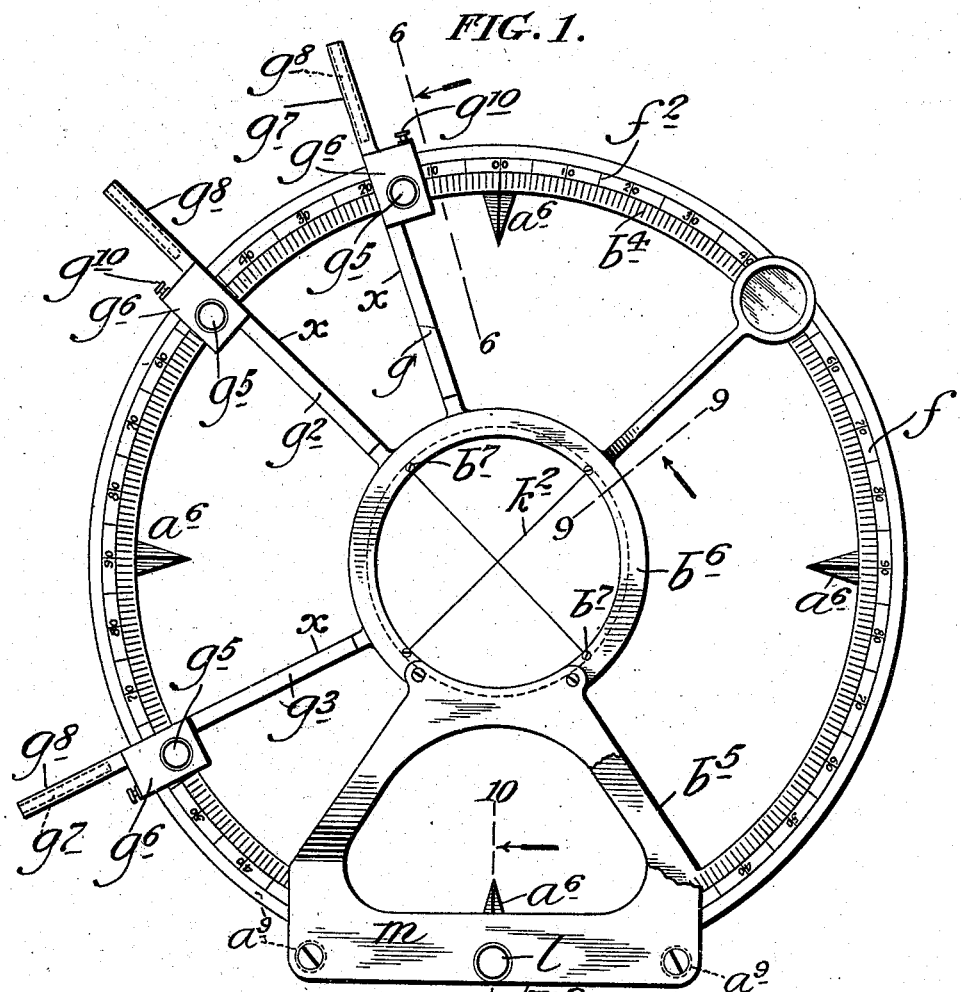

E. F. BOLJAHN.
NAVIGATOR'S INSTRUMENT.
APPLICATION FILED SEPT. 28, 1907.

918,947.

Patented Apr. 20, 1909.
4 SHEETS—SHEET 1.

WITNESSES

INVENTOR,
Emil F. Boljahn,
BY
Edgar Tate
ATTORNEYS

E. F. BOLJAHN.
NAVIGATOR'S INSTRUMENT.
APPLICATION FILED SEPT. 28, 1907.
918,947.
Patented Apr. 20, 1909.
4 SHEETS—SHEET 2.
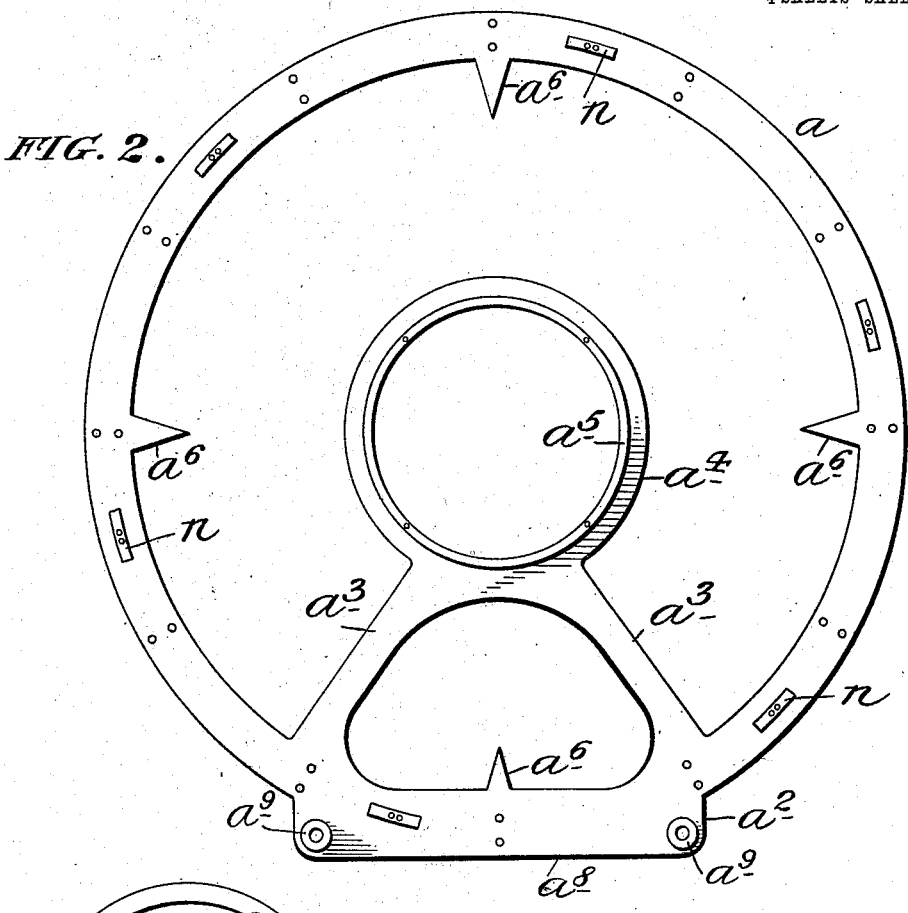
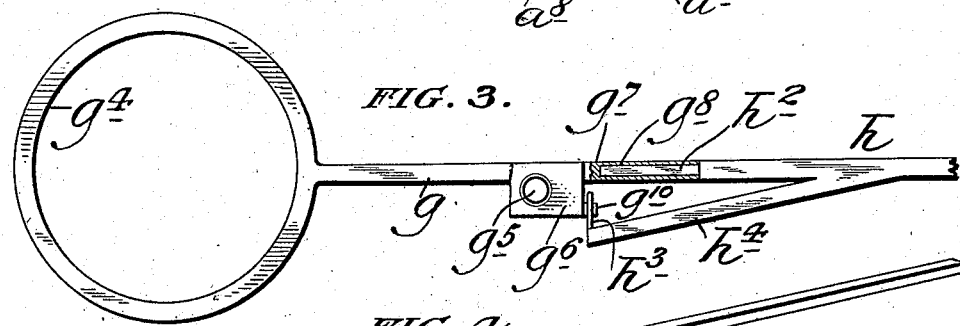
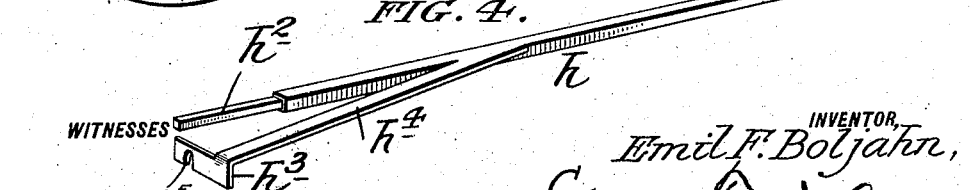

E. F. BOLJAHN.
NAVIGATOR'S INSTRUMENT.
APPLICATION FILED SEPT. 28, 1907.
918,947.
Patented Apr. 20, 1909.
4 SHEETS—SHEET 3.
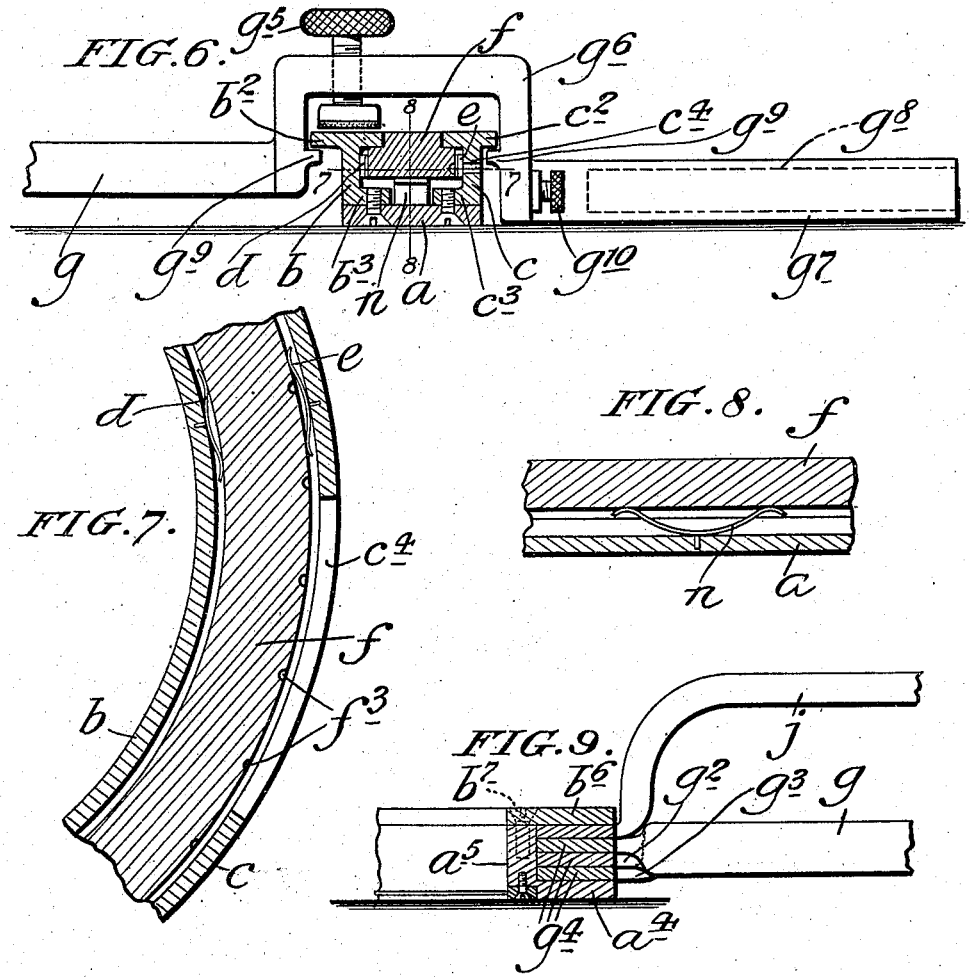
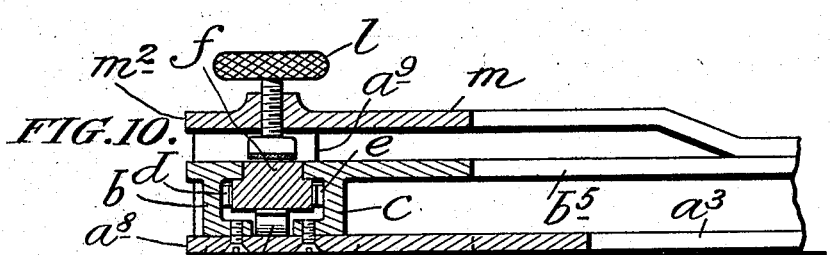
WITNESSES
M. E. Doody
C. E. Mulreany
INVENTOR,
Emil F. Boljahn,
BY Edgar Tate
ATTORNEYS

E. F. BOLJAHN.
NAVIGATOR'S INSTRUMENT.
APPLICATION FILED SEPT. 28, 1907.

918,947.

Patented Apr. 20, 1909.
4 SHEETS—SHEET 4.

WITNESSES
M. E. Doody
C. E. Mulrehany

INVENTOR,
Emil F. Boljahn,
BY Edgar Tate
ATTORNEYS

UNITED STATES PATENT OFFICE.

EMIL F. BOLJAHN, OF NEW YORK, N. Y.

NAVIGATOR'S INSTRUMENT.

No. 918,947.   Specification of Letters Patent.   Patented April 20, 1909.

Application filed September 28, 1907. Serial No. 394,968.

*To all whom it may concern:*

Be it known that I, EMIL F. BOLJAHN, a citizen of the United States, and residing at New York, in the county of New York and State of New York, have invented certain new and useful Improvements in Navigators' Instruments, of which the following is a specification, such as will enable those skilled in the art to which it appertains to make and use the same.

This invention relates to instruments for use by navigators for finding or locating a ship's position on a chart with referance to an object or objects shown; and the object thereof is to provide an improved device or instrument of this class by means of which the position of a ship may be readily found by the bearing of one object on the chart, and the line of the ship's intended track; or by the bearing of two objects on the chart and the line of the ship's intended track, or a line parallel thereto, or by the bearing of three objects on the chart and the line of the ship's intended track, or a line parallel to said track, as previously projected on the chart.

The invention is fully disclosed in the following specification, of which the accompanying drawing forms a part, in which the separate parts of my improvement are designated by suitable reference characters in each of the views, and in which:—

Figure 5:
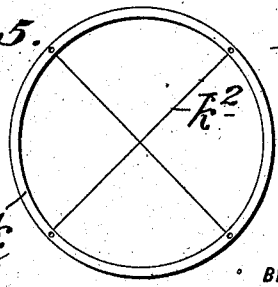
Figure 11:
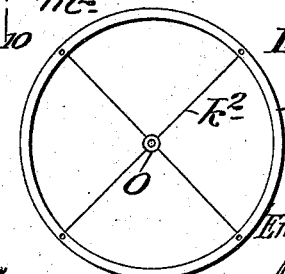

Figure 1 is a plan view of my improved navigator's instrument. Fig. 2 a plan view of the base member of the instrument. Fig. 3 a partial plan view of a rotatable arm which forms a part of the instrument, part of the construction being broken away. Fig. 4 a perspective view of the supplemental arm used in connection with the arm shown in Fig. 3. Fig. 5 a plan view of a center finder which forms a part of the instrument. Fig. 6 a section on the line 6, 6 of Fig. 1 and on an enlarged scale. Fig. 7 a section on the line 7, 7 of Fig. 6. Fig. 8 a section on the line 8, 8 of Fig. 6. Fig. 9 a section on the line 9, 9 of Fig. 1 and on an enlarged scale. Fig. 10 a section on the line 10, 10 of Fig. 1 an on an enlarged scale. Fig. 11 a modified form of the part shown in Fig. 5, and:—Fig. 12 a diagrammatic view showing the instrument in use.

In the practice of my invention I provide an annular base plate $a$, having a base extension $a^2$, on which are formed bosses $a^9$, said extension being also provided with a bottom straight edge $a^8$, and said base plate with inwardly directed arms $a^3$, which carry a central annular member $a^4$, and the inner perimeter of said member is provided with an upwardly directed annular flange $a^5$. The base plate $a$, also carries inwardly directed cardinal points $a^6$, the purpose of which will be hereinafter explained.

Mounted on the base plate $a$, and secured thereto by screws or other suitable fastening devices, are spaced ring members $b$ and $c$, having inwardly and outwardly directed top flanges $b^2$ and $c^2$, and a base flange $b^3$ and $c^3$ and by the latter the rings are secured to the base plate $a$, as shown in Fig. 6. The upper face of the inner ring member $b$, has a scale $b^4$ of degrees consisting of radially disposed lines or graduations engraved or stamped thereon, and on the outer face of the web or body portion are secured guide springs $d$. The inner ring member $b$ is further provided with radial arms $b^5$, which carry a circular central member $b^6$ corresponding to and overlying the circular central member $a^4$, and resting on and secured to the annular flange $a^5$ thereof by screws $b^7$.

The outer ring member $c$ has guide springs $e$ secured on the inner face of the web or body portion thereof, and these springs are adapted to bear against and guide a rotatable annular member $f$, adapted to rotate between and be secured within the ring members $b$ and $c$. On the upper face of the rotatable annular member $f$, I engrave, stamp or otherwise place a scale $f^2$ of degrees consisting of radially disposed lines or graduations, which in the construction shown, are equally spaced, alternate lines being numbered as indicated. To facilitate the manipulation of the rotatable annular member $f$ indentations $f^3$ are formed in the outer periphery of said annular member and a circumferential slot $c^4$ is provided in the web or body portion of the ring $c$, so that a pin or other instrument can be inserted through said slot $c^4$ and into the indentations $f^2$, to operate the member $f$.

In carrying out my invention I employ radial and rotatable arms or fingers $g$, $g^2$, $g^3$ having circular heads $g^4$ mounted on the annular flange $a^5$ of the circular central member $a^4$, and adapted to be firmly clamped or fixed to the ring members $b$ and $c$ by screws $g^5$. Two of these arms viz. $g^2$ and $g^3$ are similar in construction, and are of rolled steel or other suitable material, and are provided near the outer ends thereof with yokes $g^6$ which bridge the ring members $b$ and $c$, and the rotatable annular member $f$ and carry an extension $g^7$ having a longitudinal socket $g^8$ formed therein. The vertical portions of the yokes $g^6$ have oppositely directed and horizontally disposed locking lugs $g^9$ which are adapted to underlie the flanges $b^2$ and $c^2$ of the ring members $b$ and $c$ whereby the arms are prevented from being raised from the chart and broken, and also co-act with the screw $g^5$ to create a binding action on the underside of the flanges $b^2$ and $c^2$ effectually fixing or locking the arms at any desired point, and which will be readily understood by reference to Fig. 6.

When the chart in use is so large that the arms will not reach or "cut" the object, the bearing of which has previously been taken, it is necessary to have a longer arm or finger. I accomplish this by supplying a supplemental extension arm or finger $h$, shown detached in Fig. 4 and attached in Fig. 3, and provided with a spring member $h^4$ having a transverse inner end member $h^3$. When it is desired to attach the extension arm or finger $h$, the inner reduced end $h^2$ thereof is inserted into the socket $g^8$ and the inner end $h^3$ of the spring member or arm $h^4$ is slightly raised above and over the head of a screw or pin $g^{10}$ connected with the yokes and allowed to snap down so that a notch $g^6$ $h^5$ in the end $h^3$ of the spring member $h^4$ may engage the shank of the screw or pin $g^{10}$ behind the head thereof, thereby locking the extension arm or finger $h$ in place.

The arm or finger $g$, is slightly different from the arms or fingers $g^2$ and $g^3$, in that the yoke $g^6$ has a lateral extension in the opposite direction to that of the yokes carried by the arms or fingers $g^2$ and $g^3$.

The line of the edges $x$, of the several arms or fingers $g$, $g^2$ and $g^3$ are and must be absolutely true radially, that is, cut the exact center of the instrument, in order to insure a perfect "finding."

A "reader" $i$, is carried on a rotatable arm $j$, and is adapted to be swung over the edge $x$, of the arms or fingers and the scales so that the "reading" can be accurately ascertained.

In order to "find" or locate a ship without removing the instrument after marking with a pencil point the position on the chart, which is now necessary, I obviate the necessity of soiling the chart by marks, by employing a center finder shown in Fig. 5, and comprising fine cross wires $k^2$ carried by a circular member $k$ which is secured by screws or other suitable fastening devices in an annular groove $a^7$ in the underside of the circular central member $a^4$.

In order to hold or lock the rotatable annular member $f$ at a desired point I provide a screw $l$, which passes downwardly through a top plate $m$, similar in form to the part $a^2$, and having a straight edge $m^2$, directly over the rotatable annular member $f$ and when desired this screw is manipulated to bear on said member depressing it slightly against springs $n$, secured to the base plate $a$, at suitable distances as shown in Fig. 2, and these springs also serve to support the rotatable annular member $f$, spacing it from the base plate $a$, thereby reducing friction.

In Fig. 11 I have shown a modification of the center finder shown in Fig. 5, provided with a central ring member $o$, supported by the cross wires $k^2$, this form will be used when a mark is desired on the chart.

In the use of this instrument it is necessary to prepare beforehand the chart to be used, and a line is made thereon indicating the course or direction it is desired to sail. The direction of this line is ascertained by referring to the chart compass. We then apply the compass error, that is, for example, suppose the compass has been found to be 2° in error easterly. Our track line is due north, correct magnetic, and applying this deviation 2° easterly makes this track line read N. 2° W. by our compass and we now rotate member $f$, 2° to the right and lock it. The object of the rotatable ring $f$ is to make the instrument read as desired. In practice this ring is turned to the right or left so that the reading of the instrument will correspond with the compass course as steered by the ship, which course in turn should correspond with the track line as marked on the chart. It will be understood that after the ring $f$ has been rotated and set in the desired position the arms $g$, $g^2$ and $g^3$ are also set in the desired position according to the bearing of objects that have been taken by the compass.

In cases where we desire to locate or find the position of our ship on the chart by means of one object in view, the position of which appears on the chart together with the proposed track line of the ship we proceed as follows:—We first get the compass bearing of the object, and one of the arms is then set to the compass bearing of the object on the chart. We then place the instrument on the chart with the center line thereof in line with the track line on the chart. We then lay a parallel ruler slightly extended adjacent to the straight edges $a^8$ and $m^2$ and manipulate both the instrument and ruler until the arm in use cuts the object on the chart, the bearing of which has been taken. At this time the center of the instrument where the wires $k^2$ cross will be the ship's place or position on the chart if the ship is on the track line, but if the ship is not on the track line she will still be, in any case on the line or extension of the line as shown by the arm cutting the object, on the chart, in question.

Figure 12:
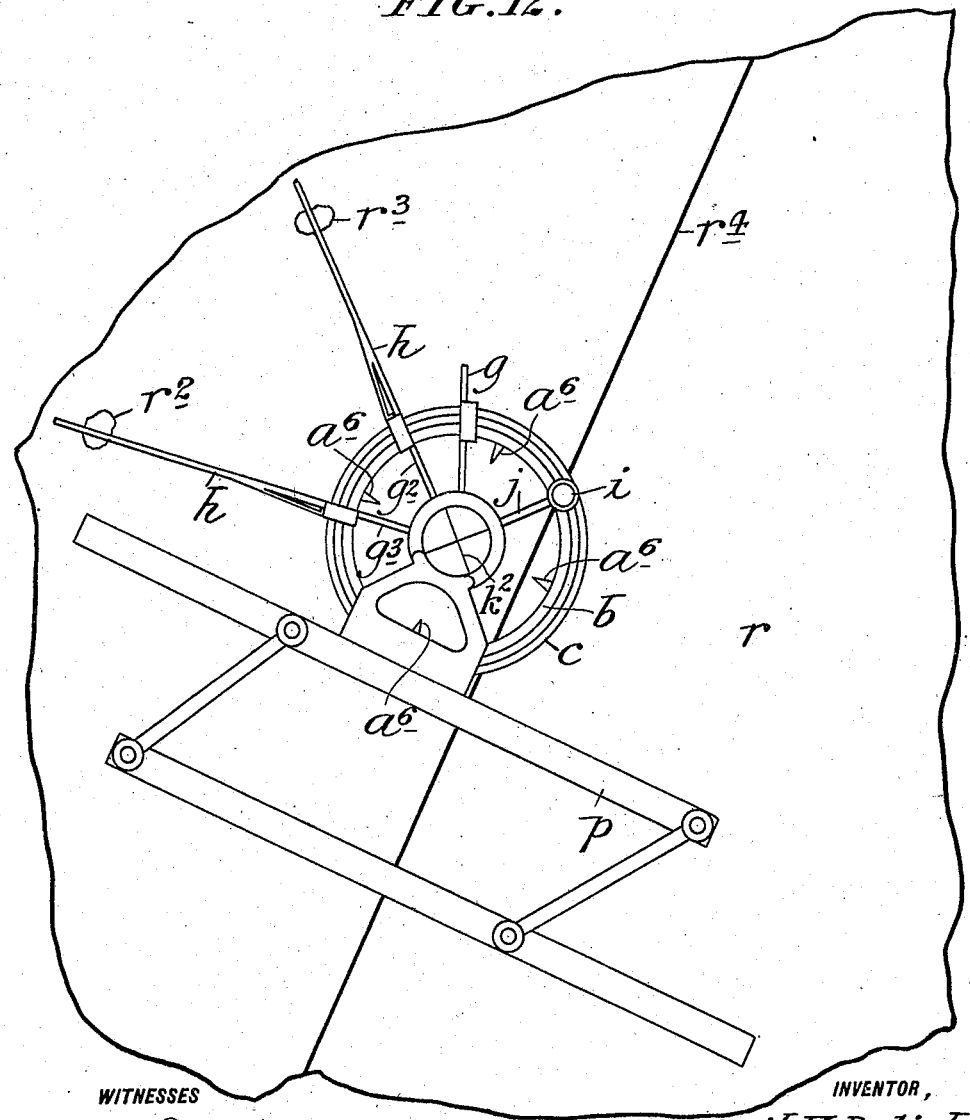

In the use of this instrument in locating or finding the position of a ship on a chart when two objects are in view, the positions of which are shown on the chart, together with the track line we proceed as follows:— We first set two arms of the instrument to the compass bearing of the two objects shown by the chart and that have a suitable angle between them, say from 30° to 150°, the nearer 90° the better. We then lay the instrument on the chart as in the first named case and manipulate the same until both arms cut their respective objects. The center of the instrument will then indicate the ship's position which will be on the track line or on an imaginary line parallel thereto, and the ship's position so found will be reliable. This method properly carried out is the most expeditious, convenient, and universally liked of all such methods now in use for finding or locating a ship's position on a chart by the bearings of objects that are marked on the chart and is generally termed the "cross bearing" method. This method of operation is illustrated in Fig. 12, in which $r$ represents the chart or a part thereof, and $r^2$ and $r^3$ two objects thereon, and $r^4$ the proposed track line of the ship.

The third method of using this instrument for locating or finding the position of a ship on a chart, when three objects are in view, the position of which together with the track line of the ship are shown on the chart, is as follows:—This method involves two angles which are included by three lines represented by the three arms $g$, $g^2$ and $g^3$ of the instrument which are set to the compass bearings of the three objects on the chart. The crossing of these three lines will occur in the center of the instrument which will be, or indicate, the ship's position. After the arms have been set to the compass bearings of their respective objects, the instrument is placed on the chart and manipulated as before set out until the three arms cut their respective objects. This method is accurate, though not as convenient as the preceding one known as the "cross bearing" method.

It will be understood that in each case, this instrument is placed so that the center line of the instrument corresponds to the vessel's track line as previously marked on the chart, and then manipulated until the arms cut their respective objects without sluing or twisting the instrument in any way from the parallel of the track line. It is in this very respect that the expediency and usefulness of this instrument is superior to all other position finding instruments of this class now in use. The instrument is previously set to the intended track line and any compass error allowed for. Then all bearings taken by the compass are so placed on the instrument without making further allowance for compass error as that has already been allowed for in setting the instrument. It will also be seen that in this proceeding some time is gained and much worry saved, as the compass error may in a moment of hurry, be very easily applied in the wrong way. This has often occurred, but in using this instrument the compass error is considered while setting the instrument to the intended course, which may, in most cases, be done beforehand, and this once done, there is no more worry about the compass error until the track line takes on a different direction.

When sailing along a track line it is by no means necessary that the ship should be absolutely on the course, as long as the bearings of objects used for finding her position are taken by compass, as nothing but a difference of compass deviation could cause an error here, but if these bearings are taken by the pelorus or some other dummy instrument, it becomes of the utmost importance that the ship should be on her course while the bearings are taken, or the ship's position so found will be erroneous. This is self-evident to anyone having any knowledge of these facts.

In using these instruments it is necessary to prepare the chart beforehand, and in doing this a chart is selected embracing the region you wish to traverse, a large scaled chart being selected. The proposed sailing line or track line of the ship is then marked on the chart, clear of all dangers or objects that must be avoided. We then ascertain the direction of this track line by referring to the chart compass and then apply the deviation of the compass on this particular course and mark this line with the compass course. We now set the position finder or instrument to this compass course, and are ready for business and don't have to worry any more about compass deviation until the track line takes on a different direction, when the instrument must be reset and the new compass deviation, whatever it amounts to, on this new direction, being again allowed for.

I will now proceed to explain one more important merit of this instrument. Many steamers and all larger yachts have on their upper bridge a glass covered chart table whereon the chart and other navigating outfit is placed for use. When running near the shore etc., navigating in this way with parallel rulers and scores of pencil lines drawn on the chart is quite convenient in pleasant weather, but when it becomes wet or breezy this outfit will have to be placed under cover and as constant reference to the chart compass will have to be made this method with pencil and sliding parallel rulers becomes somewhat less agreeable, besides it will soil the chart. Now in having the chart prepared with a track line you may place it under the glass cover so that this line as well as those objects whose bearings you use for finding the position are seen through the glass. The position finder is manipulated on top of this glass cover and as no reference to the chart compass is necessary, this glass top will not have to be lifted until it becomes necessary to change the position of or to renew your chart.

When the ship's position has been found with this position finder, the navigator is enabled by the peculiar construction of this instrument to see all around his position, and a glance at the center of the instrument and the direction of the track line will familiarize him with the ship's immediate surroundings and enable him to decide at once what to do. The instrument is left in position until new objects become available for bearings, or the bearings of objects formerly taken have changed. In this way perfect track of the ship's movements is kept.

Having fully described my invention, what I claim as new and desire to secure by Letters Patent is:—

1. In a navigator's instrument, an annular base plate, an annular central member connected therewith, spaced rings mounted on said base plate, an annular scale member rotatably mounted between said spaced rings, and radial arms mounted on and adapted to be rotated on the central member and over the spaced rings and the annular member mounted between said rings.

2. In a navigator's instrument, an annular base plate, a central annular member connected therewith, spaced rings concentrically mounted on said base plate, an annular member rotatably mounted between said spaced rings, the inner spaced ring and said annular rotatable member being provided with scales, and radial arms mounted on and adapted to be rotated on the central member and over the spaced rings and the annular member mounted between said rings.

3. In a navigator's instrument, an annular base plate, a central annular member connected therewith, spaced rings concentrically mounted on said base plate, an annular member rotatably mounted between said spaced rings, the inner spaced ring and said annular rotatable member being provided with scales, and radial arms mounted on and adapted to be rotated on the central member and over the spaced rings and the annular member mounted between said rings, said base plate being also provided with cardinal points.

4. In a navigator's instrument, an annular base plate, and an annular central member connected therewith, spaced rings concentrically mounted on said base plate, an annular member rotatably mounted between said spaced rings, the inner spaced ring and said rotatable annular member being provided with scales, and four rotatable arms mounted on and adapted to be rotated on the central member and over the spaced rings and the annular member mounted between said rings, three of said arms being provided with means for locking them to the spaced rings.

5. In a navigator's instrument, an annular base plate, and an annular central member connected therewith, spaced rings concentrically mounted on said base plate, an annular member rotatably mounted between said spaced rings, the inner spaced ring and said rotatable annular member being provided with scales, and four rotatable arms mounted on and adapted to be rotated on the central member and over the spaced rings and the annular member connected between said rings, three of said arms being provided with means for locking them to the spaced rings, and the other arm with a reader.

6. In a navigator's instrument, an annular base plate, and an annular central member connected therewith, spaced rings concentrically mounted on said base plate, an annular member rotatably mounted between said spaced rings, the inner spaced ring and said rotatable annular member being provided with scales, and four rotatable arms mounted on and adapted to be rotated on the central member and over the spaced rings and the annular member mounted between said rings, three of said arms being provided with means for locking them to the spaced rings and the other arm with a reader, the first three arms being also provided with detachable extensions.

7. In a navigator's instrument, an annular base plate, an annular central member connected therewith, spaced rings mounted on said base plate, an annular member rotatably mounted between said spaced rings, and radial arms mounted on and adapted to be rotated on the central member and over the spaced rings and the annular member mounted between said rings, said instrument being also provided at one side with a straight edge.

8. In a navigator's instrument, an annular base plate, a central annular member connected therewith, spaced rings concentrically mounted on said base plate, an annular member rotatably mounted between said spaced rings, the inner spaced ring and said annular rotatable member being provided with scales, and radial arms mounted on and adapted to be rotated on the central member and over the spaced rings and the annular member mounted between said rings, said instrument being also provided at one side with a straight edge.

9. In a navigator's instrument, an annular base plate, and an annular central member connected therewith, spaced rings concentrically mounted on said base plate, an annular member rotatably mounted between said spaced rings, the inner spaced ring and said rotatable annular member being provided with scales, and four rotatable arms mounted on and adapted to be rotated on the central member and over the spaced rings and the annular member mounted between said rings, three of said arms being provided with means for locking them to the spaced rings, said instrument being also provided at one side with a straight edge.

10. In a navigator's instrument, an annular base plate, an annular central member connected therewith, spaced rings mounted on said base plate, an annular scale member rotatably mounted between said spaced rings, and radial arms mounted on and adapted to be rotated on the central member and over the spaced rings and the annular member mounted between said rings, said central annular member being also provided with a center finder.

11. In a navigator's instrument, an annular base plate, an annular central member connected therewith, spaced rings mounted on said base plate, an annular scale member rotatably mounted between said spaced rings, and radial arms mounted on and adapted to be rotated on the central member and over the spaced rings and the annular member mounted between said rings, said central annular member being also provided with a center finder, consisting of a ring secured therein and radial cross wires connected therewith.

12. In a navigator's instrument, an annular base plate, an annular central member connected therewith, spaced rings mounted on said base plate, an annular scale member rotatably mounted between said spaced rings, and radial arms mounted on and adapted to be rotated on the central member and over the spaced rings and the annular member mounted between said rings, said central annular member being also provided with a center finger, consisting of a ring secured therein and radial cross wires connected therewith, said radial cross wires being connected with a central eye or ring.

13. In a navigator's instrument, an annular base plate, a central annular member connected therewith and provided with an inner annular flange, spaced rings concentrically mounted on said base plate, an annular rotatable member mounted between said spaced rings, the inner spaced ring and the annular rotatable member being provided with scales, said base plate being provided with cardinal points, and four radial arms rotatably mounted on said central member and adapted to be rotated over the base plate, three of said arms being provided with means for locking them to the spaced rings, and said instrument being also provided at one side with a straight edge.

14. In a navigator's instrument, an annular base plate, a central annular member connected therewith and provided with an inner annular flange, spaced rings concentrically mounted on said base plate, an annular rotatable member mounted between spaced rings, the inner spaced ring and the annular rotatable member being provided with scales, said base plate being provided with cardinal points, and four radial arms rotatably mounted on said central member and adapted to be rotated over the base plate, three of said arms being provided with means for locking them to the spaced rings, and said instrument being also provided at one side with a straight edge, and one of said arms being provided with a reader.

15. In a navigator's instrument, an annular base plate, central annular member connected therewith and provided with an inner annular flange, spaced rings concentrically mounted on said base plate, an annular rotatable member mounted between said spaced rings, the inner spaced ring and the annular rotatable member being provided with scales, said base plate being provided with cardinal points, and four radial arms rotatably mounted on said central member and adapted to be rotated over the base plate, three of said arms being provided with means for locking them to the spaced rings, and said instrument being also provided at one side with a straight edge, and one of said arms being provided with a reader, and the first three arms being provided with detachable extensions.

16. In a navigator's instrument, an annular base plate, an annular central member connected therewith, spaced rings mounted on said base plate, a rotatable annular member mounted between said spaced rings, radial arms mounted on and adapted to be rotated over the central member and over the base plate, and means for locking the rotatable annular member against rotation.

17. In a navigator's instrument, an annular base plate, an annular central member connected therewith, spaced rings mounted on said base plate, a rotatable annular member mounted between said spaced rings, radial arms mounted on and adapted to be rotated over the central member and over the base plate, and means for locking the rotatable annular member against rotation, said instrument being also provided at one side with a straight edge.

18. A navigator's instrument comprising a base member provided with an annular scale member, a rotatable scale member mounted in connection with the annular scale member, a central annular member and radial arms rotatably mounted on the central annular member.

19. A navigator's instrument comprising a base member provided with an annular scale member, a rotatable scale member mounted in connection with the annular scale member, a central annular member and radial arms rotatably mounted on the central annular member, three of said arms being provided with means for locking them to the annular scale member.

20. A navigator's instrument comprising a base member provided with an annular scale member, a rotatable scale member mounted in connection with the annular scale member, a central annular member and radial arms rotatably mounted on the central annular member, three of said arms being provided with means for locking them to the annular scale member, and the rotatable scale member being also provided with a locking device.

21. A navigator's instrument comprising a base provided with a stationary annular scale, a rotatable scale member mounted in connection therewith, a central circular open member, rotatable arms mounted on the central circular member, and extending over the base and stationary and rotatable scale, said instrument being provided at one side with a straight edge.

In testimony that I claim the foregoing as my invention I have signed my name in presence of the subscribing witnesses this 23rd day of September, 1907.

EMIL F. BOLJAHN.

Witnesses:
M. E. DOODY,
C. E. MULREANY.